March 4, 1958     J. LAMB     2,825,583
PIPE COUPLER WITH SHUT-OFF VALVE
Filed May 24, 1954     4 Sheets-Sheet 1

INVENTOR: JOHN LAMB
BY: Oswald H. Milmore
HIS ATTORNEY

March 4, 1958 J. LAMB 2,825,583
PIPE COUPLER WITH SHUT-OFF VALVE
Filed May 24, 1954 4 Sheets-Sheet 2

INVENTOR:
JOHN LAMB
BY: Oswald H. Milmore
HIS ATTORNEY

March 4, 1958 J. LAMB 2,825,583
PIPE COUPLER WITH SHUT-OFF VALVE
Filed May 24, 1954 4 Sheets-Sheet 3
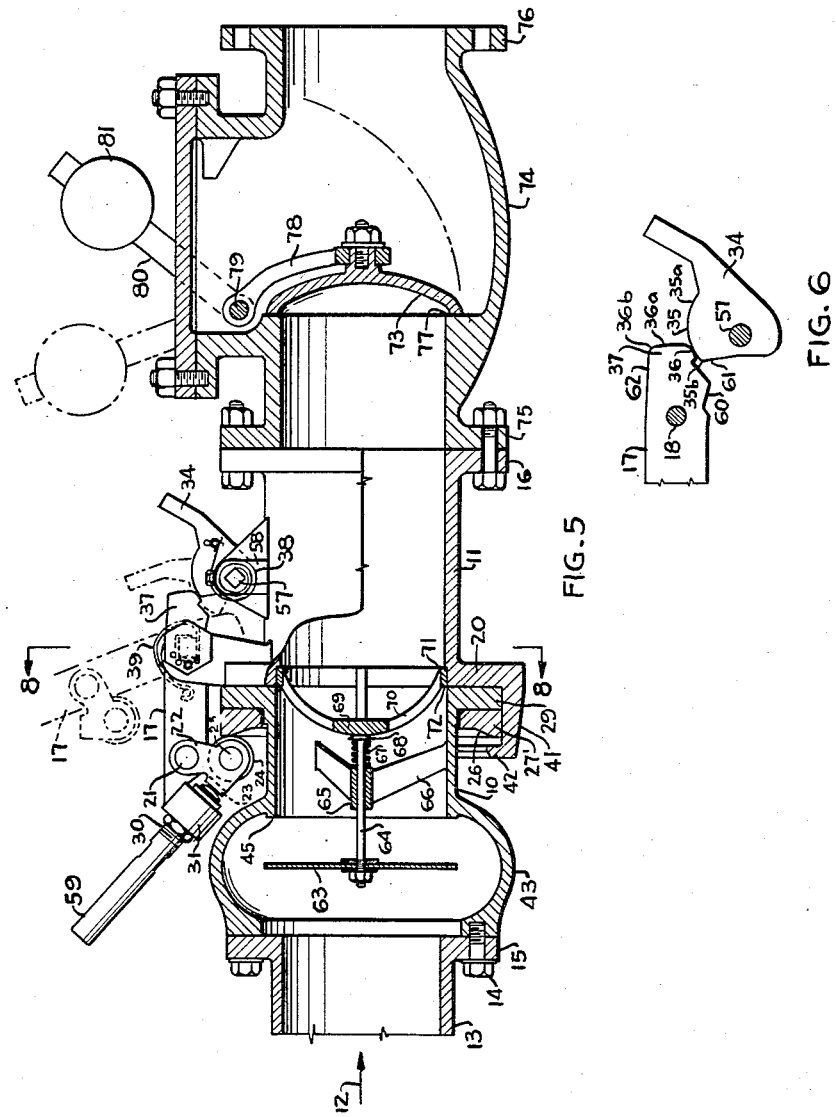
INVENTOR:
JOHN LAMB
BY: Oswald H. Milmore
HIS ATTORNEY

United States Patent Office 2,825,583
Patented Mar. 4, 1958

2,825,583

PIPE COUPLER WITH SHUT-OFF VALVE

John Lamb, London, England, assignor to Shell Development Company, New York, N. Y., a corporation of Delaware Application May 24, 1954, Serial No. 431,900

Claims priority, application Great Britain July 20, 1953

1 Claim. (Cl. 284—18)

This invention relates to pipe couplers adapted for connecting and disconnecting two conduits rapidly, having a shut-off device for minimizing the spillage of fluid, the term conduits being used to include rigid pipes as well as flexible hoses, etc. The invention is particularly although not exclusively suitable for handling liquids in relatively large-diameter conduits or pipelines, for example, those having an internal diameter of approximately eight inches and upwards.

There are certain occasions when it is necessary to uncouple as rapidly as possible two sections of a conduit carrying a fluid and at the same time to prevent or reduce to a minimum the loss of any fluid as a result of the uncoupling. Such occasions arise, for instance, when ships are being supplied with liquid petroleum products such as fuel either for transport or bunkering purposes, when petroleum products are being discharged from a ship, and when fluid-carrying pipelines pass across swing or other displacement type bridges.

Numerous coupling devices have been proposed which permit the rapid coupling and uncoupling of fluid-carrying conduits of relatively small diameter without the loss, or with only a small loss, of fluid but such devices are generally restricted to couplings for pipelines the ends of which are small enough to be easily and quickly moved bodily by manual operation. When dealing with larger-diameter conduits, for example eight inches inside diameter and upwards, it is impossible to achieve rapid and easy fluid-tight coupling and uncoupling with manual movements, and the general method of coupling adopted, for example, in connecting up oil tankers to a shore installation, is to bolt together the end flanges of the appropriate conduit fittings, an operation which may involve the location and tightening of a dozen or more bolts. The coupling and uncoupling of such joints takes a considerable time and this has marked disadvantages, for example in the loading of tankers where fuel is supplied at the rate of 4,000 tons an hour; in such a case, the time necessary to bolt and unbolt a conventional coupling of the type referred to consumes a large part of the total time taken to load the tanker. Moreover, in the event of fire occurring, it is imperative to stop filling and to disconnect from the shore installation as rapidly as possible, and here again the bolted type of coupling has obvious disadvantages. Moreover, the conventional bolted type of coupling has no means for preventing the continued flow of fluid from the supply side largely because a cut-off valve that opens when the conduit sections are separated, if provided, would be open or partly open during the operations of securing and removing the bolts from the flanges and would thus be inoperative for important periods of time, with considerable resultant loss of fluid. Bolted couplings require the removal of fluid pressure or even emptying of the conduits, before coupling and uncoupling.

It is an object of this invention to provide an improved coupler for conduits, particularly for conduits with internal diameters of eight inches and greater, including two parts that can be rapidly secured together in a fluid-tight manner and can further be rapidly uncoupled, substantially without loss of fluid even when the supply side of the conduit is full of fluid.

A further object is to provide a coupler having an automatic shut-off valve wherein the valve is arranged to minimize damage or accidental opening thereof by accidental impact on the part of the valve which projects beyond the end of the coupling member when the latter is uncoupled.

It has been found that the first object can be realized according to the invention by means of coupling members that are permanently or temporarily fixed to the ends of separate conduits and have one or more clamps by which they can be secured together or uncoupled by only single manual movements, and that further have an automatic cut-off valve at least in the coupling member that is fixed to the supply conduit and actuated toward open position by engagement with the other coupling member.

The present invention, therefore, provides a method of handling fluid, particularly in conduits with internal diameters of at least eight inches, which comprises causing the fluid to flow through a first or upstream coupling member to a second or downstream coupling member, the ends of said members being movable in relation to each other and each being joined to a conduit, said coupling members incorporating a quick-release clamp of the type hereinafter described, the said first coupling member being provided near its end with a valve which automatically opens when the coupling members are connected together and automatically shuts when the members are disconnected, the closing movement of the said valve causing or assisting the movement apart of the ends of the said coupling members.

The second coupling member is typically a fixed part of an installation which includes a receiving reservoir, for example, it is fixed to the end of a coupling pipe on the deck of a tanker and communicates to a storage compartment of the said tanker. The conduit fixed to the first coupling member is usually movable, viz., flexible, such as a flexible pipe or hose communicating with the shore oil storage installation, which will easily move away from the said second coupling member when uncoupled therefrom. Constructions in which both conduits are flexible pipes or hoses, or one or both conduits are rigid pipes mounted on pivots or in guides for radial, axial, or other type of relative movement, may also be fitted with the coupling device according to the invention.

In cases where there is a back pressure in the conduit fixed to the second coupling member, for example a pressure in the receiving reservoir, the second coupling member is also provided with a valve, preferably a non-return or check valve which may be of any known type.

When one of the conduits is stationary, the clamping means is preferably carried by the coupling member fixed thereto, viz., the second coupling member in the case indicated above; however, the invention is not limited to this preferred arrangement. This preference arises from the desirability of reducing the weight at the end of the movable conduit to a minimum.

It should be noted that this strong preference for locating the clamping means in a manner to reduce the weight on the movable conduit, which is usually the upstream conduit terminated by the first coupling member and carrying the valve, as indicated above, presents a special difficulty with regard to affording protection to the projecting end of the movable cut-off valve structure. This valve structure moves beyond the end of the first coupling member when the member is uncoupled and the valve is closed and it is difficult to protect it from accidental damage when the coupling members are separated since the external shrouding which is generally employed in similar conduits of a smaller size would constitute an undesirable increase in weight in the case of a conduit of the diameter of eight inches or more. Accordingly, the first coupling member, fixed to a flexible conduit for the transfer of fluids in accordance with the present invention, is preferably provided with a valve having a stem or supporting means which projects beyond the free end of the coupling member when the valve is closed and is formed in such a way that a blow on the projecting valve stem or supporting means will tend to deform the stem or supporting means rather than to unseat the valve.

According to a modified form of construction, valve stem or supporting means are provided which do not project beyond the end of the coupling member on the movable conduit. Such a construction, however, necessitates the provision of an actuating boss or projection on the end of the second coupling member.

The invention will be described further with reference to the accompanying drawings illustrating, by way of example, two embodiments suitable for joining a flexible shore conduit to the pipe of a tanker, in which:

Figure 5 is a longitudinal sectional view of a modified embodiment of the coupler;

Figure 6 is an enlarged detail view of parts of the release clamp of Figure 5;

Figure 1:
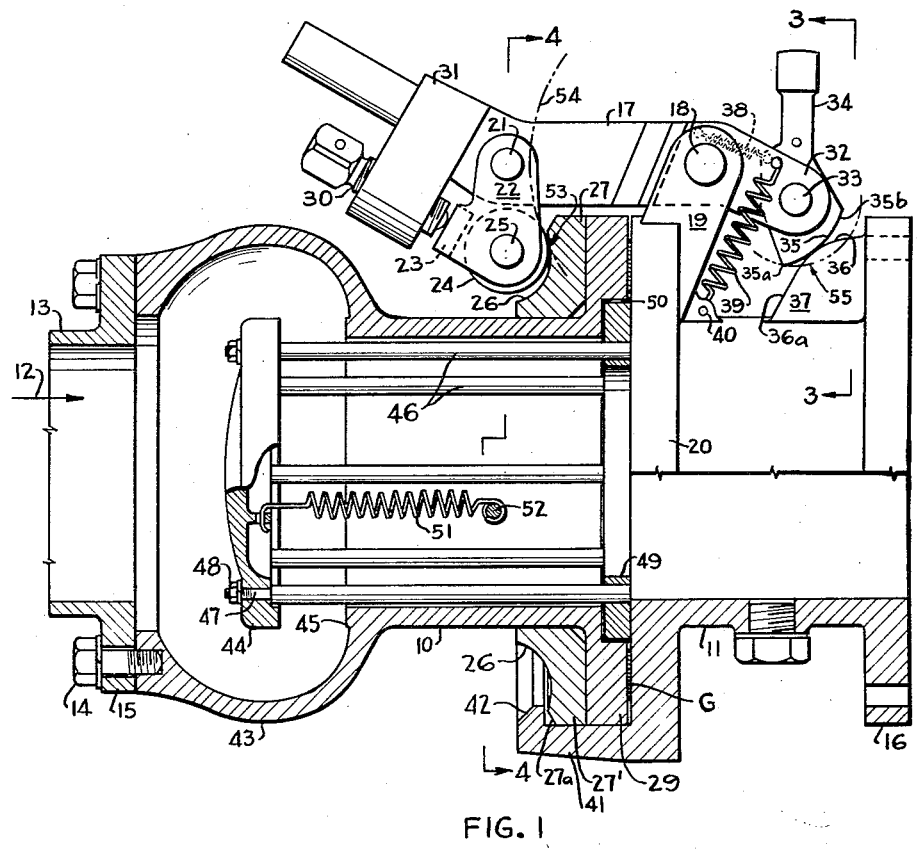
Figure 1 is a longitudinal sectional view of the coupler with the members connected with the valve open, parts being shown in elevation.
Figure 2:
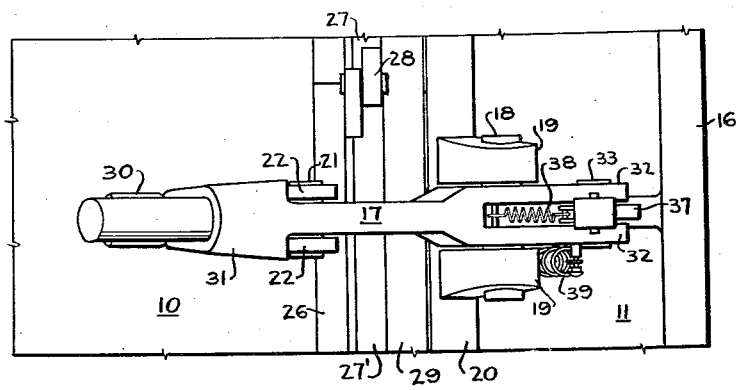
Figure 2 is a plan view of portions of the coupler.
Figure 3:
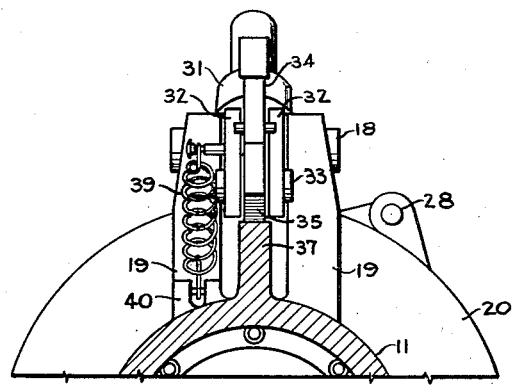
Figure 3 is a fragmentary sectional view, taken on the line 3—3 of Figure 1.

Referring to Figures 1–4 of the drawings in detail, the oil normally flows through the first coupling member 10 and the second coupling member 11 in the direction of the arrow 12, these members being permanently fixed to conduit sections. Thus, the supply section may be a flexible shore line 13 that is permanently bolted to the member 10 by bolts 14 passing through a conventional bolting flange, represented at 15; the member 11 may be bolted permanently to a rigid pipe on the tanker or other installation, not shown, by means of a bolting flange 16.

The coupling members are secured by a clamp comprising a lever 17 which is pivoted on a pin 18 mounted between brackets 19 carried by the flange 20 of the member 11. Pivoted on a pin 21 on the lever 17 are two link arms 22 joined by a bridge piece 23 and carrying a roller 24 which is free to turn on a pin 25 mounted on both arms 22. This roller makes contact with a cam surface 26 on a sectored cam ring having a pair of 180° sectors 27, 27' which are hinged at 28 so they can be laid around the member 10 behind the flange 29 thereof; these rings separate from the coupling members and are united to them only by the inward pressure of the roller 24 and the other similar rollers described below. The roller 24 is held in contact with the cam surface 26 in the desired position by an adjusting screw 30 which bears on the bridge piece 23 and is threadedly mounted in a downwardly protruding part 31 of the lever 17. The lever 17 extends beyond the part 31.

The end of the lever 17 on the side of the pin 18 remote from the roller 24 is bifurcated, and the forked ends 32 carry a transverse pin 33 on which is mounted, so as to be freely rotatable with respect to the lever 17, a trigger arm 34. The top end of the latter is enlarged and projects out to be freely accessible to be struck by a mallet. The lower surface 35 of the trigger arm cooperates with a cam surface 36 formed on the upper part of a ramp 37 which may be integral with the member 11. The trigger is urged to rotate in the anti-clockwise sense (as seen in Figure 1) by an actuating force provided by a tension spring 38 anchored at one end to the trigger above the pin 33 and at the other end to the lever 17. The lever is itself urged to rotate in the clockwise sense by a restoring force provided by a tension spring 39 anchored at one end to the lever 17 to the right of the pin 18 and at the other end to a lug 40 on the bracket 19. It will be understood that the spring 38 or 39 could be replaced by another arrangement providing an actuating or restoring force; for example, in a suitable case the lever 17 and trigger arm 34 could be appropriately weighted so that they were urged by gravity to rotate in the clockwise and anti-clockwise directions, respectively.

Figure 4:
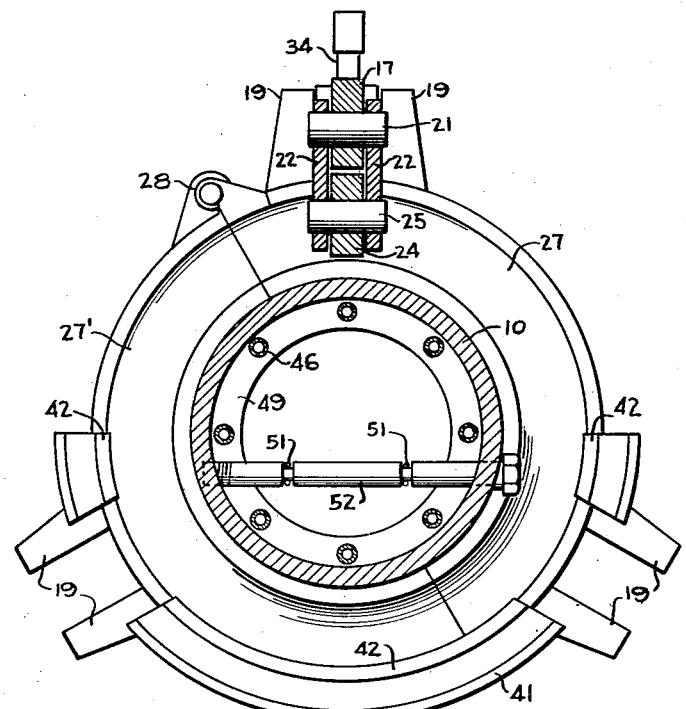
Figure 4 is a transverse sectional view taken on the line 4—4 of Figure 1 but showing only parts of the first coupling member.
Figure 7:
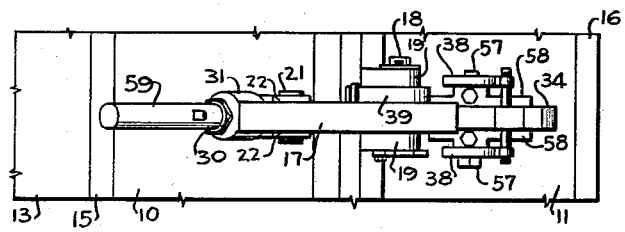
Figure 7 is a plan view of portions of the coupler according to Figure 5.
Figure 8:
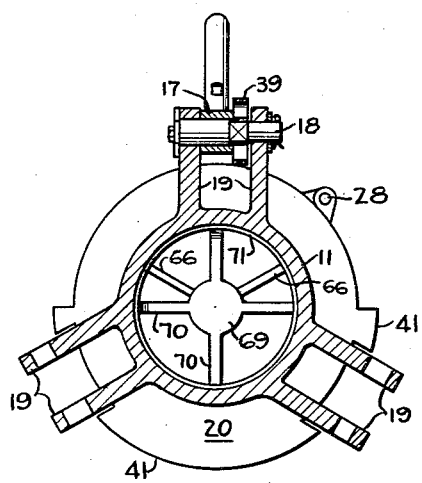
Figure 8 is a cross section of the coupler taken on the broken section line 8—8 of Figure 5.

It is generally necessary to provide a number of clamps around the circumference of the flanged joint in order to make the joint liquid-tight. In the example shown, in which the coupling members and associated conduits are of ten-inch bore, three clamps spaced 120° apart are provided, as indicated in Figure 4, which shows only the brackets 19 of the additional two clamps; the two lower clamps themselves are not shown, but are constructed with levers and associated parts constructed as described above.

To facilitate positioning the coupling member 10 in juxtaposition to the member 11 the latter has at the bottom thereof an arcuate, axially protruding wall 41 terminating in an inwardly directed lip 42. These parts are formed integrally with the flange 20 and extend through approximately 180° of arc or less and they are interrupted at the positions for the additional clamps as shown in Figure 4.

The coupling member 10 has a cylindrical passage adjoining the abutting end flange 29. This part communicates with a chamber contained within an enlarged part 43, preferably spheroidal in shape, housing therein a flat cut-off valve member 44 adapted to seat peripherally on an annular seat 45. The valve member may be made of any suitable material, such as hard vulcanized natural or synthetic rubber, e. g., the material marketed in Great Britain under the trademark "Tufnol." It is supported on a plurality of longitudinal rods, e. g., eight tubes 46, which are internally threaded at the left ends (viewed in Figure 1) and fixed to the valve member by threaded studs 47 and nuts 48. The tubes are small in cross section so as to occupy only a trivial part of the cylindrical passage. The right ends of the tubes are expanded into an anchor ring 49 which is adapted to nest in a recess 50 formed in the flange 29 and has a depth slightly greater than the thickness of the ring. The tubes 46 are situated on a circle and form a cage so as to have a slight clearance, for example 1/32 inch, from the inner cylindrical wall of the member 10, whereby the latter acts as a valve guide, permitting axial movement of the valve structure comprising the member 44, the tubes 46 and the ring 49. The valve structure is urged towards the right by two tension springs 51 which are anchored at their left ends to the valve member 44 and at their right ends to a pin 52 secured to the member 10. When the coupling member 10 is spaced from the member 11 the valve structure is thus free to move toward the right until the valve member 44 seats on the seat 46; in this position the anchor ring 49 extends outwardly beyond the flange 29. The tubes 46 and ring 49 constitute a valve actuator for unseating the valve when pushed in.

Operation is as follows: To couple the conduit sections, the sectored cam ring 27, 27' is first placed around the member 10 adjacent the flange 29 and the member 10 is then hoisted into register with the tanker pipe coupling member 11 and rested on the lip 42, the valve member 44 being still seated. A sealing ring or gasket G may be placed on this wall to be positioned between the flanges 20 and 29. The member 10 is then thrust rapidly toward the member 11 to bring the flange 29 to rest on the wall 41. As a result the anchor ring 49 strikes the face of the flange 20 and is forced into the recess 50, thus opening the valve 44. The clamps (preferably three) are then quickly closed, thus producing an oil-tight seal between the flanges 20 and 29. In the case of each clamp, this involves turning the lever 17 in an anti-clockwise sense (as seen in Figure 1 for the uppermost clamp), so that the roller 24 comes into contact with the upper edge of the cam surface 26 on the ring 27. This is the position shown approximately in Figure 1, and the point of contact 53 which is indicated in the drawing between the roller and cam surface is one point on the line of contact between the two members, and is herein referred to as the "initial" point of contact. As the lever 17 is further depressed, this point of contact describes an arc 54 about the axis of the pin 18 while the cam surface determines the locus of the roller in relation to the ring 27. This locus is such that the roller 24 and cam surface 26 cooperate in the manner of a wedge to force the flanges 20 and 29 together. This is achieved by so forming the surface 26 that the said locus has a radius of curvature which is everywhere greater than of opposite sign to that of the circle 54. In the example shown in the drawings, the radius of curvature of the locus varies from about infinity at the initial point 53 to a finite value, of opposite sign to the radius of curvature of the circle 54, at the lower part of the surface 26.

The final clamping pressure may be applied with the aid of an extension rod (not shown) such as a pipe fitted over the end of the lever 17. Flanges 29 of different thicknesses can be accommodated by means of the adjusting screw 30, which can also be used to take up any wear in the roller 24 or cam surface 26.

The cam or pressure ring 27, 27' serves to distribute the pressure around the circumference of the flanges. Furthermore, if the flange 29 has been provided with holes, the ring 27, 27' also serves to cover up such holes.

The releasable locking device, which retains the lever 17 in the clamped position, operates as follows: it will be seen, by comparing the shape of the surface 35 of the end of the trigger arm with a circle 55 described about the pivot axis of the pin 33 and intercepting the lowermost part 35a of the arm, that the end 35b of the surface 35 is nearer this pivot axis than is the end 35a. Hence, as the lever 17 is turned anti-clockwise from the position shown in Figure 1, thus increasing the distance between the pivot 33 and the cam surface 36, the spring 38 constantly turns the trigger arm 34 in the anti-clockwise direction relatively to the lever 17 and so maintains a part of the surface 35 in contact with the surface 36. In short, the spring 38 causes the surface 35 to ride on the cam surface 36 so that at every clamping position of the lever 17, the reaction between the surfaces 35 and 36 holds the lever against rotation in the clockwise direction, thereby maintaining the reaction between the roller 24 and the cam surface 26 so as to afford a locking action.

The lower part 36a of the cam surface 36 on the ramp 37 serves to hold the arm 34 in a clockwise direction when the lever 17 is in unclamped, clockwise position prior to engagement of the roller 24 with the cam surface 26, so as to tension the spring 38.

The clamping together of the flanges 20 and 29 can take place very rapidly, for example in less than two seconds in the case of ten-inch diameter pipes, so that even if the coupling member 10 and the associated conduit is full of oil, very little is lost during the operation of coupling the members together. Usually the member 11 and the associated pipeline will be empty before starting to fill a tanker compartment.

When it is desired to uncouple the members 10 and 11, the releasable locking devices are actuated by knocking the upper end of each trigger arm 34, for example by a hammer blow, toward the right, thereby swinging the trigger arm clockwise (as seen in Figure 1) against the action of the spring 38. This allows the lever 17 to turn in the clockwise sense under the action of the spring 39 and relieves the pressures between the roller 24 and the cam surface 26 and between the surfaces 35 and 36. The roller 24 facilitates this action by minimizing friction. The cumulative effect is an almost instantaneous movement of the lever 17 into a position in which the spring 39 is contracted and the flange 29 completely released from the flange 20.

When the members 10 and 11 are thus uncoupled the member 10 falls or swings away from the member 11 largely under the influence of the attached, oil-filled pipe 13, the bevelled edge 27a on the cam ring facilitating passage over the lip 42. The oil pressure in the member 10, aided by the springs 51, rapidly closes the valve member 44 and holds it against its seat 45, thereby virtually preventing any oil spillage, a matter of great importance when inflammable oils are being handled and a fire breaks out or is threatened in the tanker. The initial separation of the members 10 and 11 is further caused and/or assisted by the action of the springs 51, which push the anchor ring 49 against the flange 20.

In the event of an emergency uncoupling, it is possible that the anchor ring 49 and/or the ends of the tubes 46 may strike against some obstruction, for example the lip 42, and the resulting displacement of the ring and/or the tubes may tend to unseat the valve member 44. This contingency is avoided by using tubes of relatively soft metal, for example brass, and with thin walls, so that the result of striking an obstruction is to deform the tubes rather than to unseat the valve member 44. This deformation of the tubes may necessitate replacement of the rods 46 and ring 49 before the coupling member 10 can be used again, but this is a small loss compared with the great gain of practically instantaneous emergency uncoupling and cessation of flow and continued closure of the valve member despite striking against some object.

While the releasable locking device is shown in the drawings as having the form of a member pivoted to the lever 17 and cooperating with a cam surface 36, alternative forms of the device may be used, as an example of which there may be mentioned a device operating on the principle of a pawl and ratchet, in which case the pawl is to be considered as the trigger member and the ratchet as the ramp on which this member operates. It will be understood that in the latter case the lever will not be held continuously in every clamping position, since the locking action is discontinuous, but this action can be regarded, and is herein so regarded, as being effective to hold the lever in substantially any clamping position thereof.

A modified form of cut-off valve and clamp are shown in Figures 5–8. The clamp differs from that shown in Figures 1–4 primarily in that the pivoted trigger member of the releasable locking device is mounted on the tubular coupling member 11 by a pin 57 journalled in brackets 58, and the ramp 37 is constituted by the end of lever 17, which carries the cam surface 36; and also in that the lever 17 ends at the left at the part 31, and clamping action is exerted by a handle-shaped extension 59 on the adjusting screw 30. All parts shown in Figures 5–8 which function in the same way as the corresponding parts of Figures 1–4 bear the same reference numbers as in Figures 1–4. The helical tension springs 38 and 39 of the clamp of the first embodiment are replaced in this embodiment by spiral springs bearing like numbers. Springs 38 urge the trigger arm 34 in an anti-clockwise direction and spring 39 urges the lever 17 in a clockwise direction. The position of the lever 17 when the clamp is open is indicated by the showing in Figure 5 of the profile of certain parts in chain lines; from this showing it will be noted that an inclined face 60 is provided towards the right end of the lever 17 and abuts against the flange 20 when the lever is in open position, thereby limiting the movement of the lever due to the action of the spiral spring 39.

The co-action of the cam surfaces is evident from Figure 6, wherein the springs are omitted. On the trigger arm, the part 35a is the end of the cam surface 35 farthest out from the pivot axis of the pin 57 and 35b is the end nearest the axis; parts of the surface situated progressively nearer the part 35a are in engagement with the cam surface 36 as the springs 38 rotate the trigger arm 34 in the anti-clockwise sense as the lever 17 is swung into closed or clamping position. To release the clamp the projecting end of the trigger arm 34 is struck a blow to the right (as viewed in Figures 5 and 6) turning the arm clockwise until the end 35b clears the end of the lever 17; this frees the lever to swing into the chain line position. When the part 36b of the lever clears the end 35b, the trigger arm swings in an anti-clockwise direction fully to the chain line position with the surface 61 thereof in engagement with surface 62 of the lever. However, when the lever is moved from the open position in the anti-clockwise direction the surface 62 thereof pushes against the surface 61 of the trigger arm and rotates the latter again in a clockwise direction, attaining a position slightly beyond the solid line position shown when the parts 35b and 36b are juxtaposed. During the continued turning of the lever the substantially arcuate surface 36a slides over the surface 35; finally, when the roller 24 closely approaches the cam surface 26 the cam surface 36, which slopes toward left from the arcuate part 36a, moves into engagement with the cam surface 35. It is from this point onward that the trigger arm moves gradually in the anti-clockwise direction to lock the lever in the most advanced position thereof.

It will also be noted that Figures 5–8 show a modified form of the cut-off valve. This includes a valve member that is in the form of a plate or disc 63 contained within the enlargement 43 and made of stainless steel, e. g., 3/16 inch thick, mounted on a central valve stem 64 which is guided in a tubular guide 65. The guide is supported centrally of the member 10 by a spider 66 and abuts the left end of a coiled compression spring 67, the right end of which engages a head 68 at the end of the valve stem so as to urge the valve member 63 against the annular valve seat 45. This arrangement is such that no part of the valve structure ever projects out of the member 10 beyond the flange 29, so that the above-mentioned possibilities of damaging the valve assembly upon uncoupling are obviated. This arrangement, however, necessitates the provision of a valve-actuating boss or abutment 69 carried by a spider 70 having a ring 71 which is expanded into an annular recess 72 in the flange 20 at the end of the coupling member 11. When the members 10 and 11 are coupled together, the valve member 63 is held open by engagement of the head 68 with the boss 69. A further advantage of this arrangement is that a very small longitudinal travel of the valve member 63 (e. g., 3/16 inch), as compared with the valve member 44 of Figure 1, makes it possible to provide for a given flow rate past the valve with an enlargement 43 of minimum size. This contributes to the weight reduction of member 10.

Figure 5 further shows a non-return valve 73 mounted in a casing 74 that is bolted by a flange 75 to the flange 16 on the member 11; the casing has a bolting flange 76 by which it can be bolted to the tanker pipe. The casing provides an annular valve seat 77 which is situated reasonably close to the flange 20 and the valve 73 is supported by a swinging arm 78 mounted on a rotatable shaft 79 to seat on the valve seat 77 when in closed position. The shaft 79 projects through the casing 74 and carries, fixed thereon outside the casing, an arm 80 having a weight 81 near its extremity. By means of this arrangement, the valve may be held either in the open or in the closed position by the action of the weight 81, although it will normally be actuated by fluid pressure. The use of a non-return valve such as the valve 73 is particularly necessary when there is gas or vapor under pressure in the tanker pipe, for example when handling a hydrocarbon mixture at a temperature near its boiling point.

I claim as my invention:

A quick-release coupler for large diameter conduits comprising: first and second conducting coupling members having abutting flanges making a fluid-tight connection between them, quick-release clamp means mounted on one of said flanges, said clamping means being of the type wherein a clamping member turns over the edge of one flange on operation of a lever pivotally mounted on the other flange, said coupling members having coaxial flow passages, the flow passage in said first coupling member including in aligned relation a cylindrical portion adjoining the abutting end thereof, a spheroidal enlarged chamber and a flow opening beyond said chamber, said chamber having an annular valve seat situated immediately radially beyond said cylindrical part, a flat transverse valve member situated wholly within said chamber having an area only slightly in excess of that of said cylindrical portion of the passage and adapted to seat on said valve seat, a longitudinal valve actuator supportingly connected to said valve member and extending through said cylindrical portion and reciprocally guided by the wall of said cylindrical portion, said valve actuator consisting of soft metal thin walled tubes equidistantly spaced from one another and in close proximity to the said wall and parallel thereto, and a ring mounted on the end of said tubes farthest removed from said valve member, said ring being recessed into the abutting end of the first coupling member, said ring being adapted for engagement with the abutting end of said second coupling member to force the abutting flanges apart upon disengagement of the quick-release clamp means.

References Cited in the file of this patent

UNITED STATES PATENTS

| | | |
|---|---|---|
| 944,024 | Fitzpatrick | Dec. 21, 1909 |
| 1,064,862 | Sharp | June 17, 1913 |
| 1,069,038 | Shields | July 29, 1913 |
| 1,493,306 | Wilkinson | May 6, 1924 |
| 1,893,979 | Barrere | Jan. 10, 1933 |
| 2,048,388 | Johnsen | July 21, 1936 |
| 2,348,478 | Jones | May 9, 1944 |
| 2,383,249 | Hardwick | Aug. 21, 1945 |
| 2,396,880 | Purcell | Mar. 19, 1946 |
| 2,409,753 | Harrison et al. | Oct. 23, 1946 |
| 2,444,451 | Kelso | July 6, 1948 |
| 2,518,299 | Fernandez | Aug. 8, 1950 |
| 2,634,927 | Smith et al. | Apr. 14, 1953 |

FOREIGN PATENTS

| | | |
|---|---|---|
| 555,640 | France | Mar. 27, 1923 |